United States Patent
Murata et al.

(10) Patent No.: US 10,754,137 B2
(45) Date of Patent: Aug. 25, 2020

(54) MICROSCOPE APPARATUS

(71) Applicant: OLYMPUS CORPORATION, Hachioji-shi, Tokyo (JP)

(72) Inventors: Kazuki Murata, Hachioji (JP); Koji Imazeki, Hachioji (JP); Daisuke Mizusawa, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 53 days.

(21) Appl. No.: 15/934,913

(22) Filed: Mar. 23, 2018

(65) Prior Publication Data

US 2018/0284412 A1 Oct. 4, 2018

(30) Foreign Application Priority Data

Mar. 31, 2017 (JP) .................................. 2017-072150

(51) Int. Cl.
*G02B 21/06* (2006.01)
*G02B 21/12* (2006.01)

(52) U.S. Cl.
CPC ............. *G02B 21/12* (2013.01); *G02B 21/06* (2013.01)

(58) Field of Classification Search
CPC .... G02B 21/00; G02B 21/0032; G02B 21/02; G02B 21/025; G02B 21/06; G02B 21/12; G02B 21/125; G02B 21/248
See application file for complete search history.

(56) References Cited

U.S. PATENT DOCUMENTS

| 4,555,620 | A | * | 11/1985 | Bridson | G02B 21/0096 250/205 |
|---|---|---|---|---|---|
| 4,661,692 | A | * | 4/1987 | Kawasaki | G02B 21/244 250/201.2 |
| 4,725,720 | A | * | 2/1988 | Sawada | G02B 21/241 250/201.3 |
| 5,706,127 | A | * | 1/1998 | Saito | G02B 21/24 359/368 |
| 8,451,534 | B2 | * | 5/2013 | Tamura | G02B 21/06 359/385 |
| 2004/0080817 | A1 | * | 4/2004 | Yamaguchi | G02B 21/0016 359/385 |

FOREIGN PATENT DOCUMENTS

JP 2004085959 A 3/2004

* cited by examiner

*Primary Examiner* — Thong Q Nguyen
(74) *Attorney, Agent, or Firm* — Holtz, Holtz & Volek PC

(57) ABSTRACT

A microscope apparatus includes: a light source configured to irradiate a specimen with illumination light; a revolver configured to hold plural objective lenses and arranges the plural objective lenses switchably onto an optical path; a sensor configured to detect an objective lens arranged on the optical path; a first illumination light quantity table configured to store therein a first illumination light quantity set for each of the plural objective lenses; a second illumination light quantity table configured to store therein a second illumination light quantity specified by an observer; an illumination light quantity setting unit configured to set validity/invalidity of the first illumination light quantity and second illumination light quantity; and an illumination controller configured to control light quantity of the light source to the first illumination light quantity or second illumination light quantity validated by the illumination light quantity setting unit.

6 Claims, 9 Drawing Sheets

FIG.3

| | | 122a |
|---|---|---|
| REVOLVER HOLE | INSTRUCTION VALUE FROM FIRST ILLUMINATION LIGHT QUANTITY INPUT UNIT | D/A CONVERSION INPUT VALUE |
| 1 | 30 | 450 |
| 2 | 64 | 3000 |
| 3 | 95 | 15000 |
| 4 | 132 | 4000 |
| 5 | 165 | 6000 |

FIG.4

| | | 122b |
|---|---|---|
| | INSTRUCTION VALUE FROM SECOND ILLUMINATION LIGHT QUANTITY INPUT UNIT | D/A CONVERSION INPUT VALUE |
| 1 | 100 | 25000 |

FIG.5

| TYPE OF SWITCH | FIRST ILLUMINATION LIGHT QUANTITY SWITCH | SECOND ILLUMINATION LIGHT QUANTITY SWITCH | SELECTED ILLUMINATION LIGHT QUANTITY |
|---|---|---|---|
| STATE OF SWITCH | OFF | OFF | FIRST ILLUMINATION LIGHT QUANTITY AND SECOND ILLUMINATION LIGHT QUANTITY ARE BOTH INVALID |
| | OFF | ON | SECOND ILLUMINATION LIGHT QUANTITY IS VALID |
| | ON | OFF | FIRST ILLUMINATION LIGHT QUANTITY IS VALID |
| | ON | ON | SECOND ILLUMINATION LIGHT QUANTITY IS VALID |

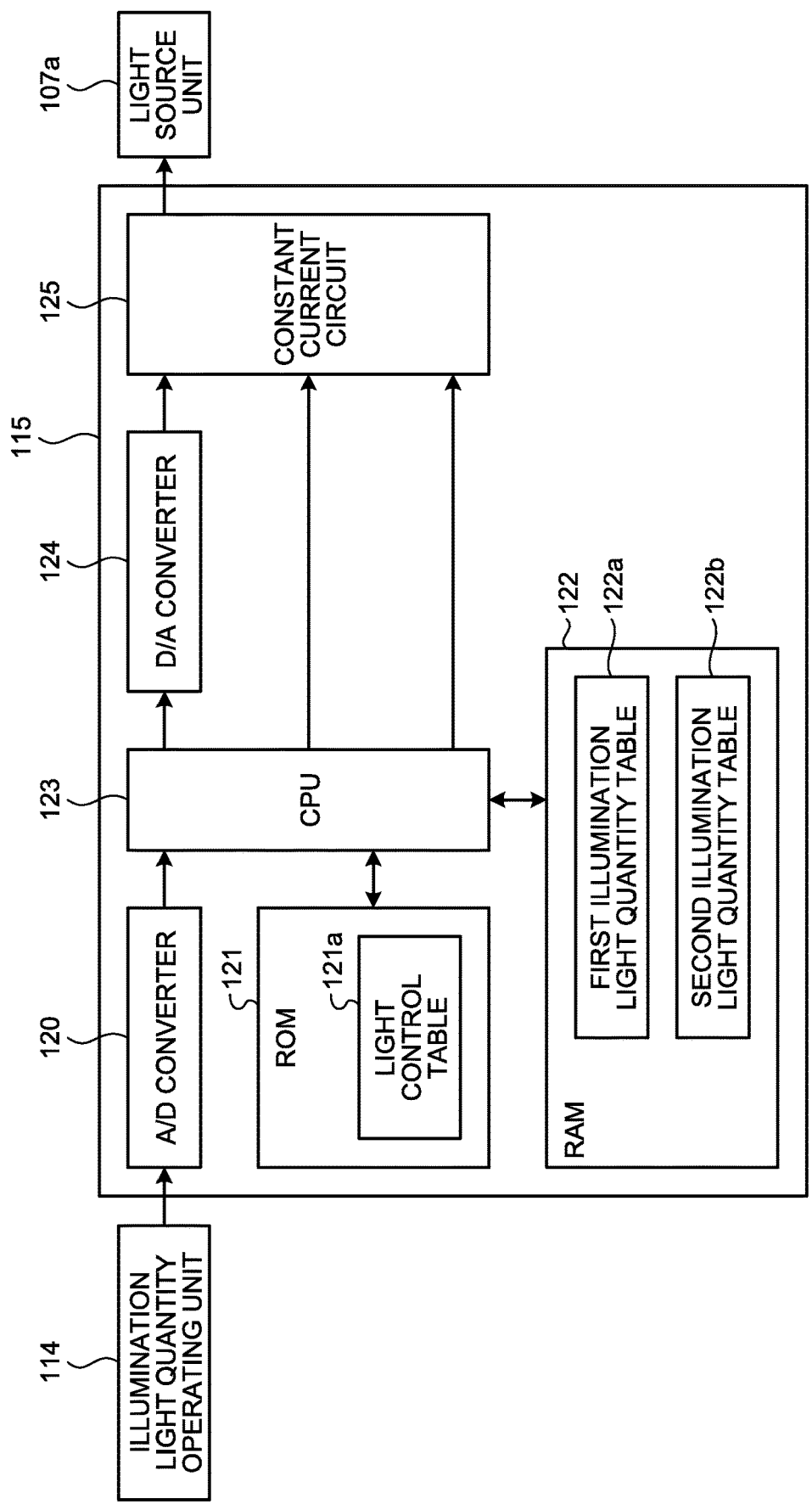

FIG.7

| | INSTRUCTION VALUE FROM ILLUMINATION LIGHT QUANTITY INPUT UNIT | D/A CONVERSION INPUT VALUE | LED CURRENT VALUE |
|---|---|---|---|
| SMALL LIGHT QUANTITY REGION | 0 | 0 | 0 mA |
| | ... | ... | ... |
| | 127 | 65535 | 30 mA |
| LARGE LIGHT QUANTITY REGION | 128 | 2910 | 31 mA |
| | ... | ... | ... |
| | 255 | 65535 | 700 mA |

121a

MICROSCOPE APPARATUS

CROSS-REFERENCE TO RELATED APPLICATION

This application is based upon and claims the benefit of priority from Japanese Patent Application No. 2017-072150, filed on Mar. 31, 2017, the entire contents of which are incorporated herein by reference.

BACKGROUND

The present disclosure relates to a microscope apparatus.

In the related art, with a microscope apparatus, which includes a revolver that enables switch among plural objective lenses and that enables any of the objective lens to be arranged on an optical path, an observer performs observation of a specimen by performing the switch among the objective lenses as appropriate. Since optimum light quantity of illumination light differs depending on the magnification of the objective lens, when the objective lens is switched to another objective lens, light quantity of the illumination light needs to be adjusted.

Proposed as a technique for saving labor for adjustment of light quantity of illumination light in switch among objective lenses is a light quantity setting and reproducing function of: detecting, with a sensor, a hole number of a revolver positioned on an optical path; acquiring the optimum light quantity of the illumination light for an objective lens corresponding to the hole number stored in a memory beforehand; and controlling light quantity of the illumination light (see, for example, Japanese Unexamined Patent Application Publication No. 2004-085959).

SUMMARY

A microscope apparatus according to one aspect of the present disclosure includes: a light source configured to irradiate a specimen with illumination light; a revolver configured to hold plural objective lenses and arranges the plural objective lenses switchably onto an optical path; a sensor configured to detect an objective lens arranged on the optical path; a first illumination light quantity table configured to store therein a first illumination light quantity set for each of the plural objective lenses; a second illumination light quantity table configured to store therein a second illumination light quantity specified by an observer; an illumination light quantity setting unit configured to set validity/invalidity of the first illumination light quantity and second illumination light quantity; and an illumination controller configured to control light quantity of the light source to the first illumination light quantity or second illumination light quantity validated by the illumination light quantity setting unit.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3 is a diagram illustrating an example of a first illumination light quantity table;

FIG. 4 is a diagram illustrating an example of a second illumination light quantity table;

FIG. 5 is a diagram illustrating relation between a first illumination light quantity switch and a second illumination light quantity switch;

FIG. 6 is a block diagram of an illumination control unit;

FIG. 7 is a diagram illustrating an example of a light control table;

DETAILED DESCRIPTION

Hereinafter, modes for carrying out the present disclosure will be described in detail with the drawings. The present disclosure is not limited by the following embodiment. Further, each drawing referred to in the following description schematically illustrates shapes, sizes, and positional relations merely to an extent that allows contents to be understood. That is, the present disclosure is not limited only to the shapes, sizes, and positional relations exemplified by each drawing.

Embodiment

Figure 1:
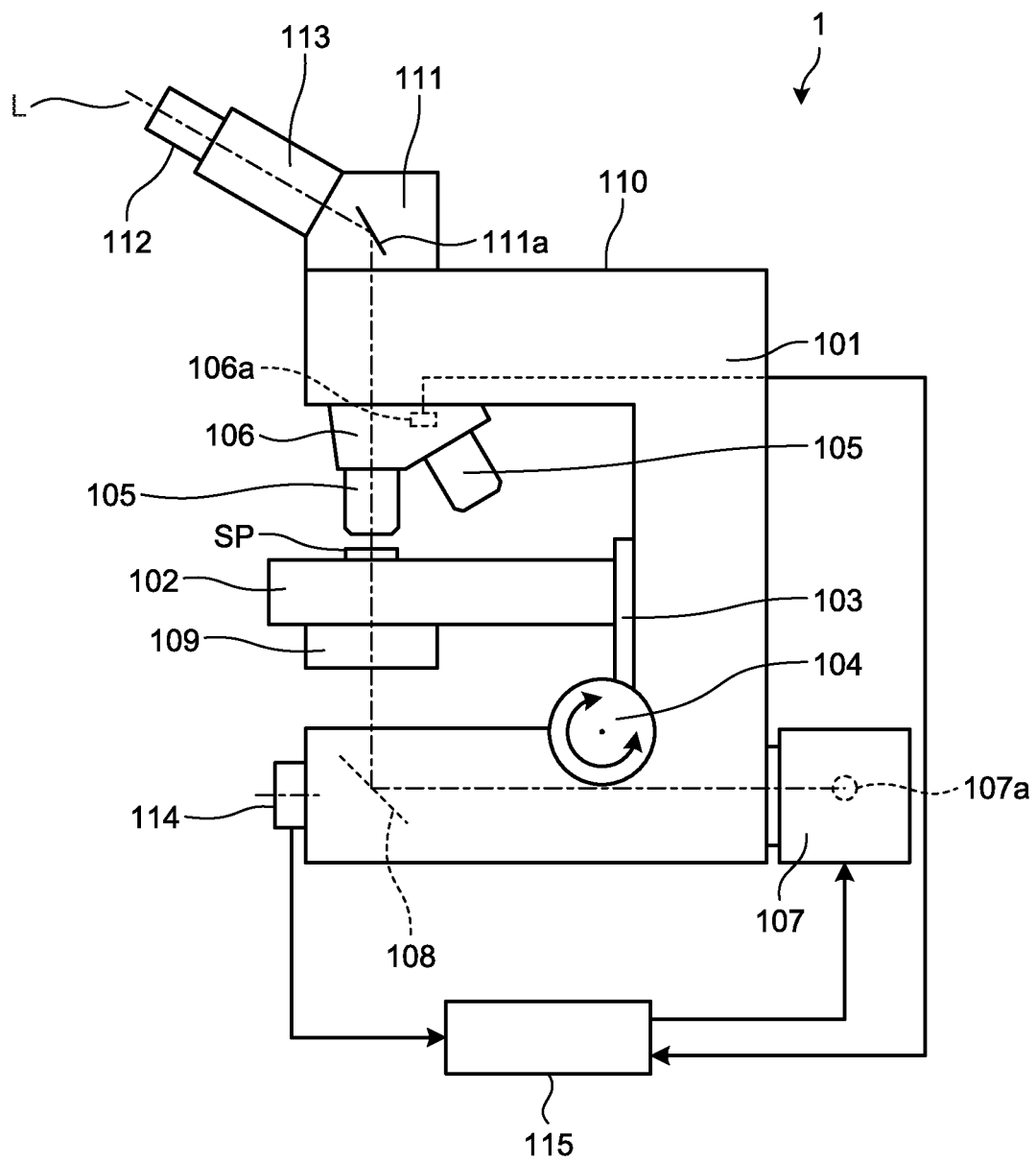
FIG. 1 is a schematic diagram illustrating a schematic configuration of a microscope apparatus according to an embodiment.

FIG. 1 is a schematic diagram illustrating a schematic configuration of a microscope apparatus according to an embodiment. A microscope apparatus 1 illustrated in FIG. 1 includes: a frame unit 101 placed on a desk; a stage 102, on which a specimen SP is placed; a holding table 103, which holds the stage 102 movably in a vertical direction (up-down direction); a rotating focusing unit 104, which is connected to the holding table 103 via mechanisms, such as a rack and a pinion, that are provided inside the frame unit 101 and not illustrated, and which moves the stage 102 via the holding table 103 in the vertical direction; a revolver 106, which is provided in the frame unit 101, and selectively arranges, on an optical path L, plural objective lenses 105 to be arranged above the specimen SP and having mutually different magnifications; a lamp house 107, which is detachably attached to the frame unit 101, is formed of an LED light source, and is provided with a light source unit 107a that projects light to be emitted to the specimen SP; a mirror 108, which converts, with an illumination optical system not illustrated, illumination light emitted from the light source unit 107a into parallel light, and which reflects the illumination light that has been converted into this parallel light, to the specimen SP; a condenser lens 109, which irradiates the specimen SP with the illumination light reflected from the mirror 108; a lens barrel 111, which is fixed to an upper surface of an arm unit 110 of the frame unit 101, reflects an observation image of the specimen SP entering via the objective lens 105, by a mirror 111a, and forms an image, with a tube lens or the like provided inside the lens barrel 111 and not illustrated; a binocular unit 113, which is attached to the lens barrel 111, and through which the observation image of the specimen SP is observed, with the observation image being enlarged by an eyepiece 112; an illumination light quantity operating unit 114, which adjusts light quantity of the illumination light emitted from the light source unit 107a; and an illumination control unit 115, which is communicatably connected to the light source unit 107a, and controls luminance of the light source unit 107a according to a light control signal input from the illumination light quantity operating unit 114. Further, a sensor 106a, which detects the objective lens 105 arranged on the optical path L, is provided in the revolver 106.

Figure 2:
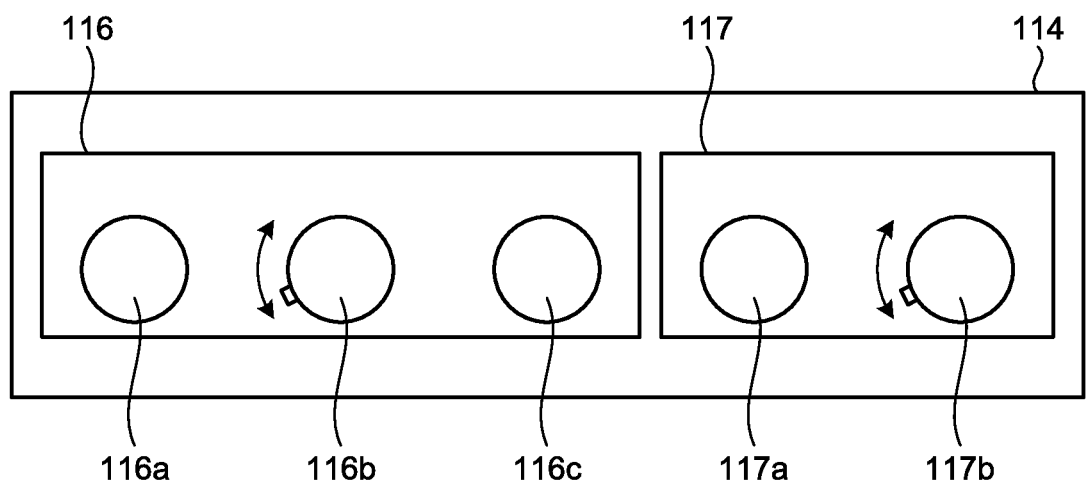
FIG. 2 is a diagram illustrating an illumination light quantity operating unit.

FIG. 2 is a diagram illustrating the illumination light quantity operating unit 114. The illumination light quantity operating unit 114 includes: a first illumination light quantity operating unit 116 that adjusts, for each of the plural objective lenses 105 held by the revolver 106, the light quantity of the illumination light emitted from the light source unit 107a; and a second illumination light quantity operating unit 117 that adjusts, for a specific objective lens 105, for example, the objective lens 105 having the highest magnification, the light quantity to a light quantity that is different from the illumination light quantity set by the first illumination light quantity operating unit 116 and that is specified by an observer.

The first illumination light quantity operating unit 116 sets a first illumination light quantity set for each of the objective lenses 105, according to types (magnifications) of the plural objective lenses 105. The first illumination light quantity operating unit 116 has: a first illumination light quantity switch 116a, which receives an instruction of whether the first illumination light quantity is valid (ON) or invalid (OFF); a first illumination light quantity input unit 116b, which receives input of the first illumination light quantity, and is rotatable; and a first illumination light quantity setting unit 116c that fixes the first illumination light quantity input through the first illumination light quantity input unit 116b.

By the first illumination light quantity switch 116a being pressed, switch-over between validity (ON) and invalidity (OFF) of the first illumination light quantity is executed. The first illumination light quantity switch 116a is pressed and made valid (ON), the first illumination light quantity input unit 116b is rotated, and light quantity for the objective lens 105 arranged on the optical path L is adjusted. The light quantity is adjusted while observation is made through the eyepiece 112; and after the light quantity is adjusted to the optimum light quantity, by the first illumination light quantity setting unit 116c being pressed, the first illumination light quantity for the objective lens 105 arranged on the optical path L is determined. The determined illumination light quantity is stored in a first illumination light quantity table 122a described later (see FIG. 3). FIG. 3 is a diagram illustrating an example of the first illumination light quantity table 122a. As illustrated in FIG. 3, stored in the first illumination light quantity table 122a are, for each of revolver hole positions where the objective lenses 105 are arranged: an instruction value for the first illumination light quantity input through the first illumination light quantity input unit 116b (e.g., as shown in FIG. 3, exemplary values of 30, 64, 95, 132, and 165 for respective revolver hole positions 1, 2, 3, 4 and 5), and a D/A conversion input value corresponding to the instruction value (e.g., as shown in FIG. 3, exemplary values of 450, 3000, 15000, 4000, and 6000 for respective revolver hole positions 1, 2, 3, 4, and 5). For each of all of the objective lenses 105 held by the revolver 106, the observer adjusts the first illumination light quantity with the first illumination light quantity operating unit 116.

The second illumination light quantity operating unit 117 adjusts a second illumination light quantity, which is a light quantity different from the illumination light quantity set by the first illumination light quantity operating unit 116, and which is specified by the observer. For example, when a part of the specimen SP is being observed with the first illumination light quantity, the part having a thickness and being near a surface of the specimen SP; an optimum light quantity or the like for observation of a part near a bottom surface of the same specimen SP and having a different thickness with the same objective lens 105 is set as the second illumination light quantity. By the second illumination light quantity being set, when observation is performed by change of the observed region with the same objective lens 105 for plural specimens SP of the same type, light control operation is able to be saved, and fatigue of the observer is able to be reduced.

The second illumination light quantity operating unit 117 has: a second illumination light quantity switch 117a, which receives an instruction of whether the second illumination light quantity is valid (ON) or invalid (OFF); and a second illumination light quantity input unit 117b, which receives input of the second illumination light quantity, and is rotatable.

By the second illumination light quantity switch 117a being pressed, switch-over between validity (ON) and invalidity (OFF) of the second illumination light quantity is executed. The second illumination light quantity switch 117a is pressed and made valid (ON), the second illumination light quantity input unit 117b is rotated, and light quantity for the objective lens 105 arranged on the optical path L is adjusted. The light quantity is adjusted while observation is performed with the eyepiece 112. The second illumination light quantity input through the second illumination light quantity input unit 117b is stored in a second illumination light quantity table 122b. FIG. 4 is a diagram illustrating an example of the second illumination light quantity table 122b. As illustrated in FIG. 4, stored in the second illumination light quantity table 122b are: an instruction value for the second illumination light quantity input through the second illumination light quantity input unit 117b (e.g., an exemplary value of 100 is shown in FIG. 4); and a D/A conversion input value corresponding to the instruction value (e.g., an exemplary value of 25000 is shown in FIG. 4).

FIG. 5 is a diagram illustrating relation between the first illumination light quantity switch 116a and the second illumination light quantity switch 117a. As illustrated in FIG. 5, when the first illumination light quantity switch 116a and the second illumination light quantity switch 117a are both valid (ON), the illumination control unit 115 validates the second illumination light quantity switch 117a, and controls the light quantity of the light source unit 107a to the second illumination light quantity stored in the second illumination light quantity table 122b, instead of to the first illumination light quantity stored in the first illumination light quantity table 122a, for the objective lens 105 arranged on the optical path.

When the first illumination light quantity switch 116a and the second illumination light quantity switch 117a are both invalid (OFF), the first illumination light quantity and the second illumination light quantity are both invalid, and the illumination control unit 115 controls the light quantity of the light source unit 107a to the instruction value from the first illumination light quantity input unit 116b. When either the first illumination light quantity switch 116a or the second illumination light quantity switch 117a is valid (ON), the illumination control unit 115 controls the light quantity of the light source unit 107a to the valid illumination light quantity.

FIG. 6 is a block diagram of the illumination control unit 115. The illumination control unit 115 includes: an A/D converter 120 that executes A/D conversion of an output signal transmitted from the illumination light quantity operating unit 114; a ROM 121 that stores therein various processing programs, and a light control table 121a; a RAM 122 that stores therein the first illumination light quantity table 122a and the second illumination light quantity table 122b; a CPU 123 that executes the processing programs stored in the ROM 121, and controls processing and operation of each unit electrically connected thereto; a D/A converter 124 that executes D/A conversion of an output signal output from the CPU 123; and a constant current circuit 125 that outputs an LED current value to the light source unit 107a, based on a D/A conversion input value input from the D/A converter 124 and a maximum current switch signal input from the CPU 123.

When an objective lens 105 having a low magnification is changed, for use, to an objective lens 105 having a high magnification, the maximum light quantity of the light source unit 107a needs to be increased, and it becomes difficult for light control resolution in a small light quantity region to be maintained. This is because due to increase in the difference between the maximum LED current value and the LED current value in the small light quantity region, a high D/A conversion resolution is needed, the level of an analog signal that controls the LED current in the small light quantity region becomes small, and susceptibility to circuit noise and the like is increased. In this embodiment, by use of the constant current circuit 125 that is able to switch the maximum current value between a small light quantity region and a large light quantity region, without change in D/A conversion resolution and operational feeling for light control, a high light control resolution in the small light quantity region and a large light quantity demanded for an objective lens 105 having a high magnification are both satisfied.

FIG. 7 is a diagram illustrating an example of the light control table 121a. As illustrated in FIG. 7, relation among instruction values from an illumination light quantity input unit (the first illumination light quantity input unit 116b or second illumination light quantity input unit 117b), D/A conversion input values, and LED current values is stored as the light control table 121a.

Figure 8:
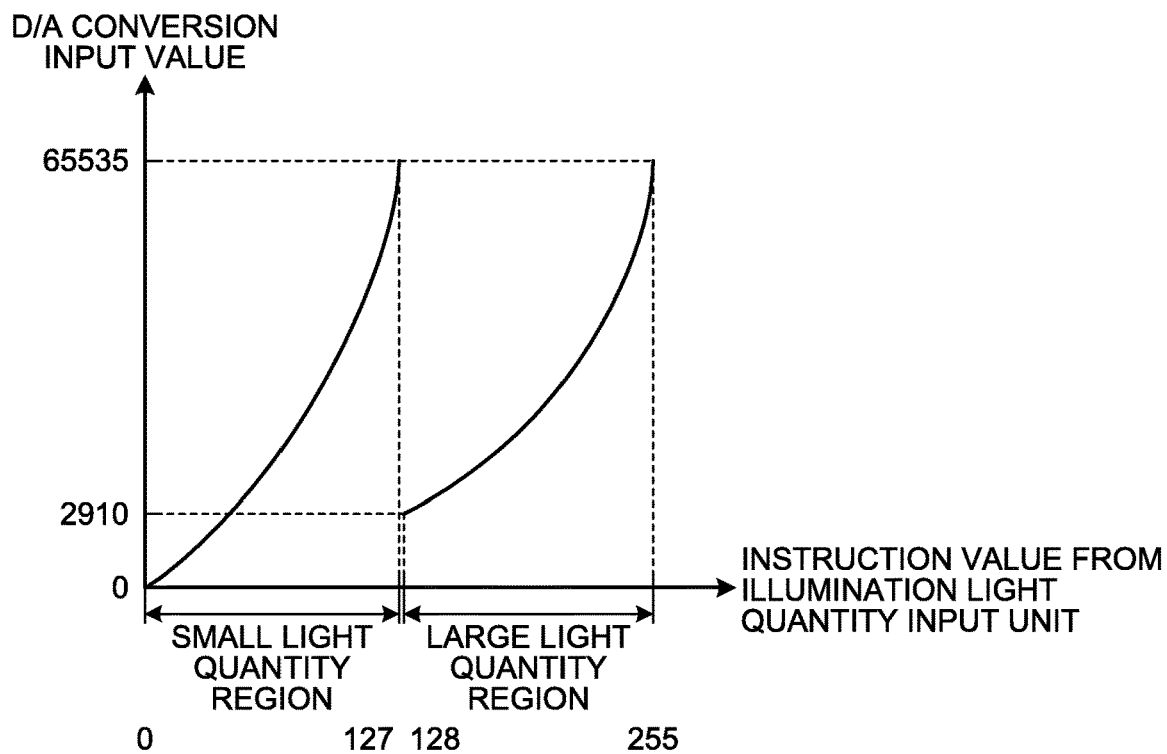
FIG. 8 is a diagram illustrating relation between instruction value from an illumination light quantity input unit and D/A conversion input value.

The constant current circuit 125 is able to switch the maximum current value between the small light quantity region and the large light quantity region; and "0" to "65535" are used as D/A conversion input values corresponding to the small light quantity region ("0" to "127") of the instruction values from the illumination light quantity input unit, and "2910" to "65535" are used as D/A conversion input values corresponding to the large light quantity region ("128" to "255") thereof. FIG. 8 is a diagram illustrating relation between instruction value from an illumination light quantity input unit and D/A conversion input value. As illustrated in FIG. 8, in the small light quantity region ("0" to "127"), as the instruction value of the illumination light quantity input unit increases, the D/A conversion value also increases, but when the instruction value from the illumination light quantity input unit becomes greater than the maximum instruction value ("127") in the small light quantity region, the large light quantity region ("128" to "255") is reached, the D/A conversion input value becomes "2910", and thereafter, as the instruction value from the illumination light quantity input unit increases, the D/A conversion input value also increases.

Figure 9:
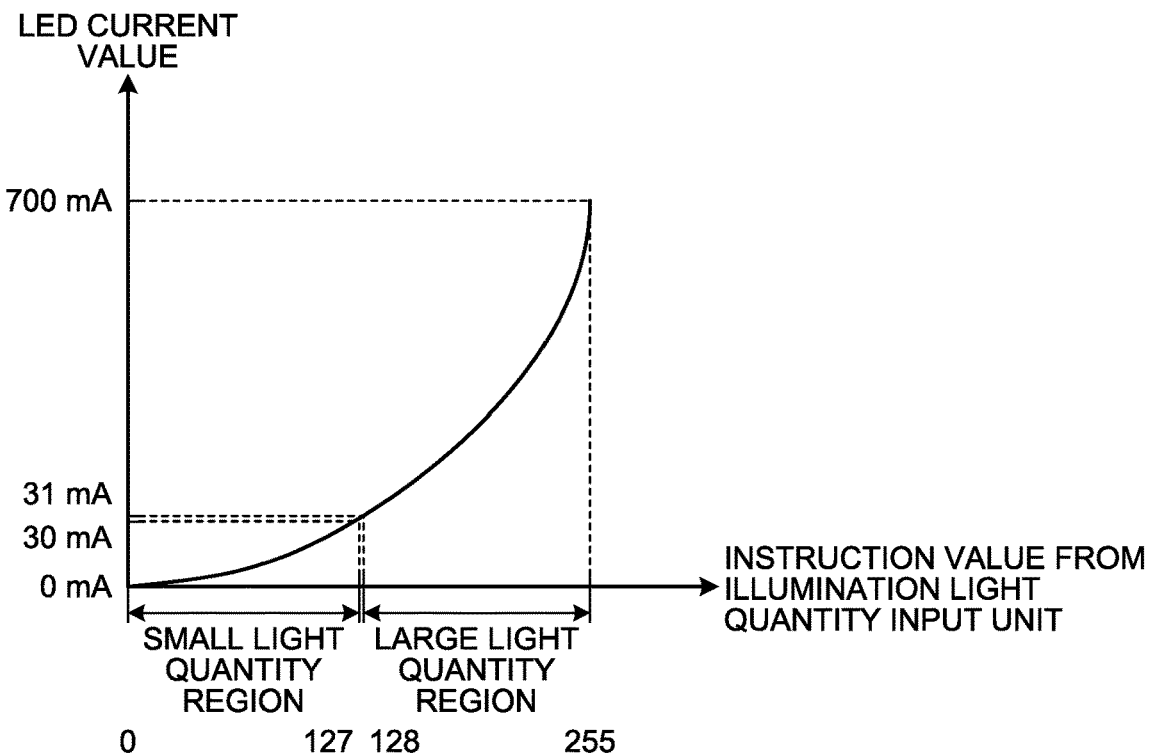
FIG. 9 is a diagram illustrating relation between instruction value from the illumination light quantity input unit and LED current value.

A maximum current value switch signal, for example, whether the maximum current value is 30 mA (small light quantity region) or 700 mA (large light quantity region), is transmitted from the CPU 123 to the constant current circuit 125, and the D/A conversion input value input from the D/A converter 124 is output, as an LED current value corresponding to the transmitted maximum current value, to the light source unit 107a. For example, when the D/A conversion input value is "65535": if the maximum current value is 30 mA, 30 mA is output as the LED current value; and if the maximum current value is 700 mA, 700 mA is output as the LED current value. Since the constant current circuit 125 determines the LED current value to be output to the light source unit 107a, based on the D/A conversion input value input from the D/A converter 124 and the maximum current value switch signal input from the CPU 123, as illustrated in FIG. 9, by use of a single illumination light quantity input unit (the first illumination light quantity input unit 116b or second illumination light quantity input unit 117b), LED current value continuous from the small light quantity region to the large light quantity region is able to be output with high D/A conversion resolution and without change in operational feeling for light control.

Figure 10:
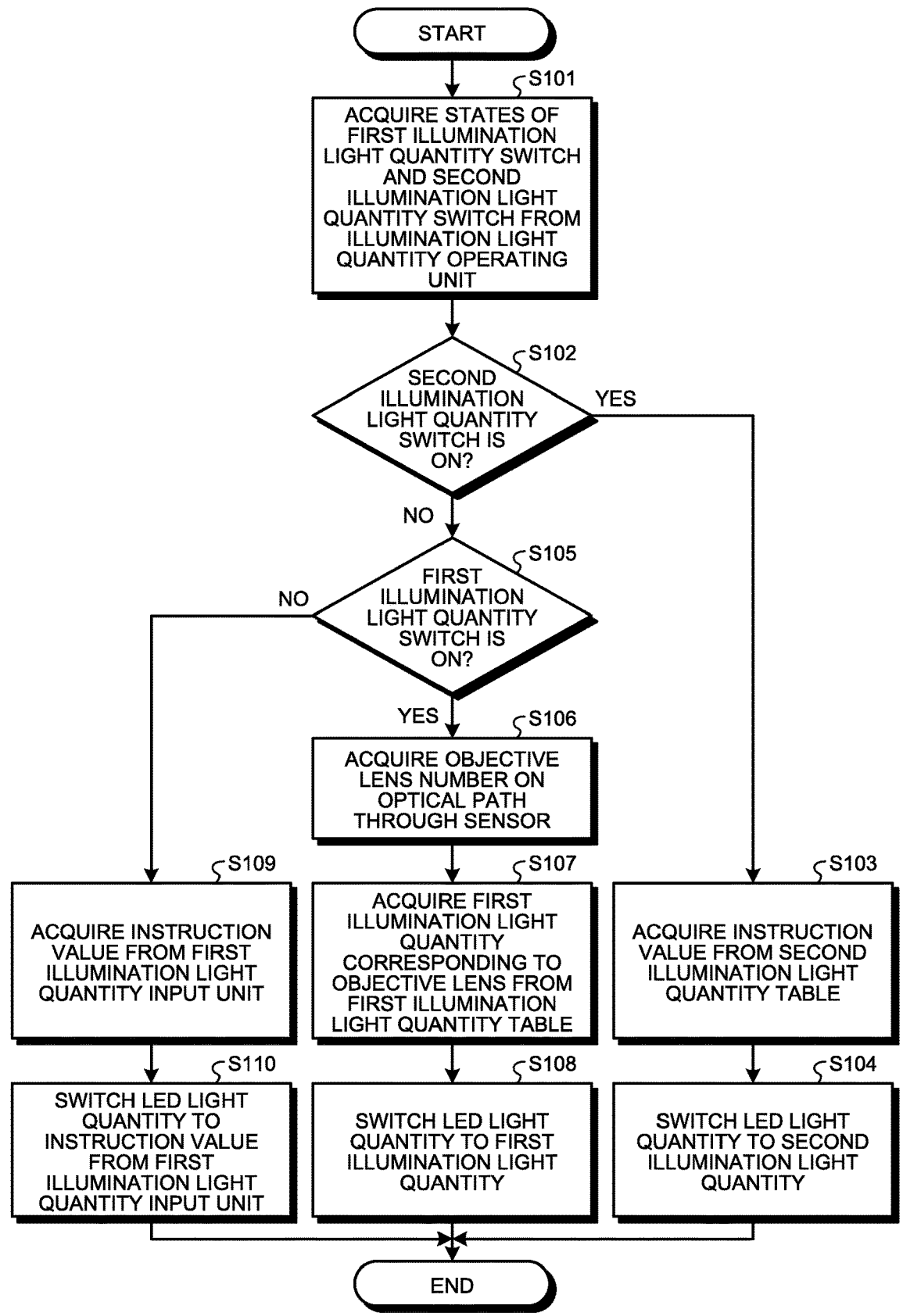
FIG. 10 is a flow chart illustrating control of illumination light quantity according to the embodiment.

Next, by reference to FIG. 10, control of illumination light quantity according to this embodiment will be described. FIG. 10 is a flow chart illustrating the control of illumination light quantity according to the embodiment.

Firstly, the illumination control unit 115 acquires, from the illumination light quantity operating unit 114, states of the first illumination light quantity switch 116a and the second illumination light quantity switch 117a (Step S101).

If the second illumination light quantity switch 117a is valid (ON) (Step S102: Yes), an instruction value input from the second illumination light quantity table 122b through the second illumination light quantity input unit 117b is acquired (Step S103).

The illumination control unit 115 controls light quantity of the light source unit 107a to a second illumination light quantity by transmitting the instruction value acquired at Step S103, to the constant current circuit 125, via the D/A converter 124, and transmitting a maximum current value switch signal (Step S104).

If the second illumination light quantity switch 117a is invalid (OFF) (Step S102: No), and the first illumination light quantity switch 116a is valid (ON) (Step S105: Yes), a number for the objective lens 105 on the optical path L is acquired through a sensor (Step S106).

The illumination control unit 115 acquires an instruction value for a first illumination light quantity for the objective lens 105 on the optical path L from the first illumination light quantity table 122a (Step S107), and controls the light quantity of the light source unit 107a to the first illumination light quantity, by transmitting the acquired instruction value to the constant current circuit 125 via the D/A converter 124 and transmitting a maximum current value switch signal (Step S108).

If the second illumination light quantity switch 117a is invalid (OFF) (Step S102: No), and the first illumination light quantity switch 116a is also invalid (OFF) (Step S105: No); the instruction value from the first illumination light quantity input unit 116b is acquired (Step S109), and the light quantity of the light source unit 107a is controlled to the instruction value from the first illumination light quantity input unit 116b by transmission of the acquired instruction value to the constant current circuit 125 via the D/A converter 124 and transmission of a maximum current value switch signal (Step S110).

In this embodiment, by a first illumination light quantity being set for each objective lens 105, adjustment of light quantity upon switch among the objective lenses 105 is able to be omitted; and also for a case where observation is desired to be performed by change in the light quantity or the like, for, for example, parts of the same specimen SP having different thicknesses by use of the same objective lens 105, a second illumination light quantity is able to be set; and thus desired observation is able to be performed easily.

In this embodiment, an LED light source is used as the light source unit 107a, but a halogen lamp or the like may be used as the light source unit 107a.

First Modified Example

Figure 11:
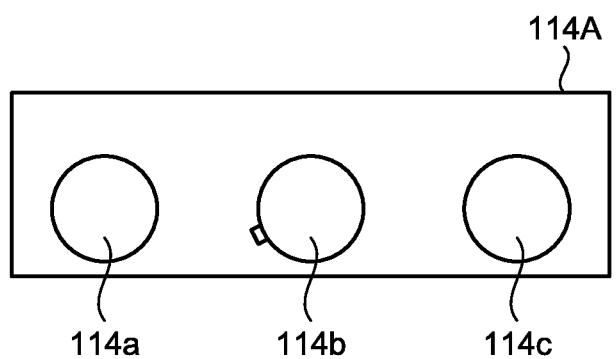
FIG. 11 is a diagram illustrating an illumination light quantity operating unit according to a first modified example of the embodiment.

In the above described embodiment, the illumination light quantity operating unit 114 includes the first illumination light quantity operating unit 116 and the second illumination light quantity operating unit 117, and the first illumination light quantity operating unit 116 and the second illumination light quantity operating unit 117 respectively set the first illumination light quantity and the second illumination light quantity, but the first illumination light quantity switch 116a and the second illumination light quantity switch 117a may be configured as a single switch. FIG. 11 is a diagram illustrating an illumination light quantity operating unit 114A according to a first modified example of the embodiment.

As illustrated in FIG. 11, the illumination light quantity operating unit 114A has: an illumination light quantity switch 114a for selection of a first illumination light quantity or a second illumination light quantity; an illumination light quantity input unit 114b, which receives input of the first illumination light quantity or second illumination light quantity, and is rotatable; and an illumination light quantity setting unit 114c that determines the first illumination light quantity or second illumination light quantity input through the illumination light quantity input unit 114b.

A momentary switch, a dial type switch, an encoder switch, or the like may be adopted as the illumination light quantity switch 114a serving as a trigger for validity (ON)/ invalidity (OFF) of the first illumination light quantity or second illumination light quantity. This first modified example has an effect of enabling setting of the first illumination light quantity or second illumination light quantity with less switches.

Second Modified Example

In the above described embodiment, the second illumination light quantity is set for a specific objective lens 105, for example, an objective lens 105 with the highest magnification, but a second illumination light quantity may be set for each objective lens 105. The second illumination light quantity table 122b may be set per objective lens 105 as illustrated in the first illumination light quantity table 122a. Further, in the second illumination light quantity table 122b, a difference between an instruction value adjusted with the second illumination light quantity input unit 117b by the observer and a first illumination light quantity value may be stored, and if the second illumination light quantity is made valid (ON), an illumination light quantity resulting from addition of the difference stored in the second illumination light quantity table 122b to the first illumination light quantity of each objective lens 105 may be set as the second illumination light quantity.

Third Modified Example

If observation including bright field (BF) observation, differential interference contrast (DIC) observation, and phase contrast (PH) observation, is able to be performed with the microscope apparatus 1, even if the same objective lens 105 is used, the required illumination light quantity differs depending on the method of observation. Therefore, by storage of the first illumination light quantity table 122a for each microscopy, and storage of the second illumination light quantity per microscopy for the second illumination light quantity table 122b also, even if observation is performed by change of microscopy for the same specimen SP, by selection of validity (ON) or invalidity (OFF) of the first illumination light quantity or second illumination light quantity through the first illumination light quantity switch 116a or second illumination light quantity switch 117a, without adjustment of the illumination light quantity being carried out, adjustment to a desired illumination light quantity is enabled.

Fourth Modified Example

If intermediate lens-barrels, which allow plural observers to observe the specimen SP individually, are connectable to the microscope apparatus 1, the required illumination light quantity differs depending on the number of intermediate lens-barrels connected, even if the same objective lens 105 is used. Thus, the first illumination light quantity and second illumination light quantity may be controlled to be increased or decreased according to the number of intermediate lens-barrels connected. The intermediate lens-barrels are connected between the frame unit 101 and the lens barrel 111.

A microscope apparatus according to the present disclosure enables, when specimens of the same type are observed with the same objective lens, the specimens to be easily observed by use of two different steps of illumination light without manual adjustment of illumination light quantity.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A microscope apparatus, comprising:
a light source configured to irradiate a specimen with illumination light;
a revolver configured to hold plural objective lenses and to switchably arrange one of the plural objective lenses onto an optical path;
a sensor configured to detect a current objective lens arranged on the optical path from among the plural objective lenses;
a memory which stores (i) a first illumination light quantity table configured to store therein a first illumination light quantity having been set for each of the plural objective lenses, and (ii) a second illumination light quantity table configured to store therein a second illumination light quantity specified by an observer;

a first illumination light quantity switch configured to set validity/invalidity of the first illumination light quantity;

a second illumination light quantity switch configured to set validity/invalidity of the second illumination light quantity; and a hardware processor configured to control a light quantity of the light source to the second illumination light quantity when both the first illumination light quantity and the second illumination light quantity are validated by setting of the first and second illumination light quantity switches.

2. The microscope apparatus according to claim 1, wherein the light source comprises an LED.

3. The microscope apparatus according to claim 1, wherein:

plural intermediate lens-barrels are connectable to the microscope apparatus, the plural intermediate lens-barrels enabling plural observers to observe the specimen individually, and the hardware processor increases or decreases the first illumination light quantity or the second illumination light quantity according to a number of the intermediate lens-barrels connected to the microscope apparatus.

4. The microscope apparatus according to claim 1, wherein:

a difference between the second illumination light quantity specified by the observer and the first illumination light quantity is stored in the second illumination light quantity table, and the hardware processor controls the light quantity of the light source to the second illumination light quantity resulting from addition of the difference to the first illumination light quantity, when the second illumination light quantity is validated by setting of the second illumination light quantity switch.

5. The microscope apparatus according to claim 1, further comprising:

a first illumination light quantity input device configured to receive input of the first illumination light quantity; and a second illumination light quantity input device configured to receive input of the second illumination light quantity.

6. The microscope apparatus according to claim 1, wherein each of the first illumination light quantity switch and the second illumination light quantity switch comprises one of a single momentary switch, a dial type switch, and an encoder switch.

* * * * *